(12) United States Patent
Heo et al.

(10) Patent No.: US 10,844,955 B2
(45) Date of Patent: Nov. 24, 2020

(54) ACTUATOR AND VEHICLE TRANSMISSION INCLUDING THE SAME

(71) Applicant: SL Corporation, Daegu (KR)

(72) Inventors: Chunnyung Heo, Daegu (KR); Minsoo Kim, Daegu (KR); Sungjin Kim, Daegu (KR); Yongjae Kim, Daegu (KR)

(73) Assignee: SL Corporation, Daegu (KR)

( * ) Notice: Subject to any disclaimer, the term of this patent is extended or adjusted under 35 U.S.C. 154(b) by 106 days.

(21) Appl. No.: 16/217,505

(22) Filed: Dec. 12, 2018

(65) Prior Publication Data

US 2019/0203832 A1 Jul. 4, 2019

(30) Foreign Application Priority Data

Dec. 29, 2017 (KR) .................. 10-2017-0184576

(51) Int. Cl.
*F16H 61/24* (2006.01)
*F16H 59/08* (2006.01)
(Continued)

(52) U.S. Cl.
CPC ............ *F16H 61/24* (2013.01); *F16H 59/08* (2013.01); *H02K 7/07* (2013.01); *H02K 7/116* (2013.01);
(Continued)

(58) Field of Classification Search
CPC ........ B60K 20/02; B60K 20/08; B60K 37/06; B60K 2370/126; F16H 61/24; F16H 59/12; F16H 2059/081; F16H 27/06; F16H 1/32; F16H 55/17; F16H 57/02; F16H 61/0204; F16H 61/0251; F16H 2708/22; H02K 7/07; H02K 49/102; G05G 1/10; G05G 1/08; G05G 25/00; G05G 5/03
(Continued)

(56) References Cited

U.S. PATENT DOCUMENTS 9,835,245 B2 * 12/2017 Lee .......................... F16H 59/08
2016/0312882 A1 * 10/2016 Heo ........................ F16H 61/24
(Continued)

FOREIGN PATENT DOCUMENTS

EP 1768009 A1 * 4/2006
EP 2159455 A1 * 3/2010
(Continued)

*Primary Examiner* — Vinh Luong
(74) *Attorney, Agent, or Firm* — Nelson Mullins Riley & Scarborough LLP; Kongsik Kim, Esq.

(57) ABSTRACT

Provided are an actuator and a vehicle transmission including the same. The actuator includes a magnet gear unit which transmits a driving force and a driving unit which drives the magnet gear unit. The magnet gear unit includes a first magnet, a second magnet disposed outside the first magnet to face the first magnet, and a pawl member inserted in parallel between the first magnet and the second magnet. The driving unit includes a circular rotor on a central axis, and any one of the first magnet, the second magnet or the pawl member is mounted to the rotor; a third magnet mounted along a circumference of the rotor: and a stator including an annular core having a plurality of protrusions that face the third magnet and coils connected to the protrusions.

19 Claims, 16 Drawing Sheets

(51) Int. Cl.
 *H02K 7/07* (2006.01)
 *H02K 49/10* (2006.01)
 *H02K 7/116* (2006.01)
 *F16H 59/02* (2006.01)

(52) U.S. Cl.
 CPC ... *H02K 49/102* (2013.01); *F16H 2059/0295* (2013.01); *F16H 2059/081* (2013.01); *F16H 2061/241* (2013.01)

(58) Field of Classification Search
 USPC .......................................... 74/473.3; 70/248
 See application file for complete search history.

(56) References Cited

U.S. PATENT DOCUMENTS

| | | | |
|---|---|---|---|
| 2018/0038478 A1* | 2/2018 | Arakawa | B60K 20/02 |
| 2018/0372216 A1* | 12/2018 | Yamanaka | G05G 5/03 |
| 2019/0203826 A1* | 7/2019 | Jiran | F16H 61/32 |
| 2020/0208738 A1* | 7/2020 | Kim | F16H 61/0204 |

FOREIGN PATENT DOCUMENTS

| | | | |
|---|---|---|---|
| EP | 2891835 A1 * | 7/2015 | |
| FR | 2804240 A1 * | 7/2001 | |
| KR | 20170080081 * | 7/2017 | |
| WO | WO 2019142519 A1 * | 7/2019 | |

\* cited by examiner

Related Art

ACTUATOR AND VEHICLE TRANSMISSION INCLUDING THE SAME

CROSS REFERENCE TO RELATED APPLICATION

This application claims priority from Korean Patent Application No. 10-2017-0184576 filed on Dec. 29, 2017, the disclosure of which is incorporated herein by reference in its entirety.

BACKGROUND

1. Field of the Disclosure

The present disclosure relates to an actuator and a vehicle transmission including the same, and more particularly, to an actuator having a magnet gear and a vehicle transmission including the actuator.

2. Description of the Related Art

Generally, vehicle transmissions change gear ratios to maintain the torque of an engine constant based on the speed of a vehicle. To change the gear ratios of a transmission, a driver operates a shift lever of the transmission. The driver may change the gear ratios by selecting a gear by operating the shift lever disposed adjacent to the driver's seat.

Transmissions are categorized into a manual transmission and an automatic transmission. The manual transmission allows a driver to manually select a gear such as a first, second, third, fourth, etc. gear based on the speed of a vehicle. The automatic transmission allows an engine control unit (ECU) of the vehicle to automatically control gears based on the speed of the vehicle, the engine load, the amount of throttle valve opening, etc.

The automatic transmission generally includes a park (P) gear to park the vehicle, a reverse (R) gear to back the vehicle, a neutral (N) gear to disconnect the output of the engine from being transmitted to a driving wheel, and a drive (D) gear to drive the vehicle forward. The driver selects each gear using a shift lever, and typical types of shift levers are a lever type and a dial type. In addition, there is a vehicle type in which each gear is provided in the form of a button.

A common lever type is configured to arrange gears in a row in the order of P-R-N-D and a lever is moved in substantially a linear direction to select each gear. Recently, in certain lever types, the shift lever is not fixed at the P-R-N-D positions, but the lever is configured to return to a preset position after being tilted according to the operation by the driver. The transmission may select a gear in such a manner that P, R. N and D are changed sequentially according to the tilting direction of the lever.

On the other hand, the dial type is configured such that the P, R. N and D gears are disposed around a dial that rotates within a predetermined angle range and a specific point of the dial is positioned at each of the P, R. N and D gears to select a gear.

FIG. 14 illustrates an example of a vehicle transmission 1 of the dial type in the related art. Referring to FIG. 14, the dial-type vehicle transmission 1 of the related art includes a detent unit F1, an automatic return unit F2, a shift lock unit F3, and a deceleration unit F4 as separate elements. The dial-type vehicle transmission 1 of the related art requires various parts to implement each unit, and the parts are packaged together within a housing. Thus, it is difficult to miniaturize the transmission. In addition, a shift method based on a general gear structure may have the problem of noise generated as the gears are operated.

Therefore, there is a need to develop a novel actuator having a more simplified and smaller configuration and a vehicle transmission including the actuator by improving the complicated mechanical power transmission structure of the conventional vehicle transmission 1.

SUMMARY

Aspects of the present disclosure provide an actuator which reduces the number of parts required by improving the power transmission structure of a conventional vehicle transmission and includes a magnet gear for reducing shift noise. Aspects of the present disclosure also provide a vehicle transmission which simplifies the mechanism for implementing detent torque, shift lock and automatic return functions by including an actuator having a magnet gear. However, aspects of the present disclosure are not limited to exemplary embodiments set forth herein. The above and other aspects of the present disclosure will become more apparent to one of ordinary skill in the art to which the present disclosure pertains by referencing the detailed description of the present disclosure given below.

According to an aspect of the present disclosure, an actuator may include a magnet gear unit which transmits a driving force and a driving unit which drives the magnet gear unit. The magnet gear unit may include a first magnet; a second magnet disposed outside the first magnet to face the first magnet; and a pawl member inserted in parallel between the first magnet and the second magnet. The driving unit may include a circular rotor on a central axle to which any one of the first magnet, the second magnet or the pawl member is mounted, a third magnet mounted along a circumference of the rotor, and a stator including an annular core having a plurality of protrusions that face the third magnet and coils connected to the protrusions.

The rotor may be rotated as an attractive force or a repulsive force is exerted on the third magnet by a magnetic force generated when a current is applied to the coils. In addition, any one of the first magnet, the second magnet or the pawl member which is disposed between the other two of the first magnet, the second magnet and the pawl member may be accelerated or decelerated relative to the rotor based on a magnet gear transmission ratio, which is defined as a ratio of the number of magnetic pole pairs included in the second magnet to the number of magnetic pole pairs included in the first magnet.

Further, the third magnet may include a plurality of magnetic poles that correspond to the number of the protrusions, and each of the first magnet and the second magnet may include at least one pair of magnetic poles, wherein polarities of the first magnet, the second magnet and the third magnet may be arranged alternatingly.

The actuator may further include a shaft inserted into the central axle of the rotor. In addition, the pawl member may include a magnetic body on a surface inserted in parallel between the first magnet and the second magnet.

According to another aspect of the present disclosure, a vehicle transmission may include a knob which may be rotated to select any one of a plurality of gears associated with operation modes of a transmission, and a magnet gear unit which may be interlocked with the knob and may provide a driver with a feel of operating the knob when the driver rotates the knob. The magnet gear unit may include a first magnet, a second magnet disposed outside the first magnet to face the first magnet, and a pawl member inserted in parallel between the first magnet and the second magnet, wherein the first magnet, the second magnet, and the pawl member may be rotatable about the same center as the knob.

The pawl member may include a magnetic body provided on a surface inserted in parallel between the first magnet and the second magnet. In addition, any one of the first magnet, the second magnet, or the pawl member may be interlocked with the knob.

Furthermore, the vehicle transmission may include a driving unit which generates holding torque, wherein the driving unit may include a circular rotor on a central axle to which any one of the first magnet, the second magnet or the pawl member which is not interlocked with the knob is mounted, a third magnet mounted along a circumference of the rotor, and a stator including an annular core having a plurality of protrusions that face the third magnet and coils connected to the protrusions.

A holding force may be generated between the third magnet and the stator by a magnetic force generated when a first holding current is applied to the coils or by connection of the coils, and the other two of the first magnet, the second magnet and the pawl member which are not interlocked with the knob may be fixed to provide the feel of operating the knob when the knob is rotated.

Meanwhile, a holding force may be generated between the third magnet and the stator by a magnetic force generated when a second holding current is applied to the coils when there is no brake operation of the driver in a parking gear and may prevent the rotation of the knob.

In addition, the vehicle transmission may further include a shaft inserted into the central axle of the rotor.

According to another aspect of the present disclosure, a vehicle transmission may include a knob which may be rotated to select any one of a plurality of gears associated with operation modes of a transmission, a magnet gear unit which transmits a driving force to the knob when an interlocking condition is satisfied, and a driving unit which drives the magnet gear unit. The magnet gear unit may include a first magnet, a second magnet disposed outside the first magnet to face the first magnet, and a pawl member inserted in parallel between the first magnet and the second magnet. The driving unit may include a circular rotor on a central axle to which any one of the first magnet, the second magnet or the pawl member is mounted, a third magnet mounted along a circumference of the rotor, and a stator including an annular core having a plurality of protrusions that face the third magnet and coils connected to the protrusions.

Further, the pawl member may include a magnetic body provided on a surface thereof, and the pawl member may be inserted in parallel between the first magnet and the second magnet. The rotor may be rotated as an attractive force or a repulsive force is exerted on the third magnet by a magnetic force generated when a current is applied to the coils. When the rotor is rotated, any one of the first magnet, the second magnet or the pawl member which is disposed between the other two may be accelerated or decelerated relative to the rotor based on the number of magnetic pole pairs included in each of the first magnet and the second magnet and the number of pawl pieces included in the magnetic body.

In particular, the knob may be interlocked with any one of the first magnet, the second magnet or the pawl member which is not mounted on the central axle of the rotor.

Meanwhile, the knob may be rotated to return to the parking gear when a condition for returning from a non-parking gear to the parking gear is satisfied. In addition, when a shift condition is satisfied in an autonomous driving mode, the knob may be rotated to select a gear corresponding to the shift condition. Further, a unit angle at which the knob is rotated to select a gear may be determined by a multiple of an angle obtained by dividing 360° by any one of the number of magnetic pole pairs included in the first magnet, the number of magnetic pole pairs included in the second magnet, or the number of pawl pieces included in the magnetic body.

Meanwhile, the third magnet may include a plurality of magnetic poles that correspond to the number of the protrusions, and each of the first magnet and the second magnet may include at least one pair of magnetic poles, wherein polarities of the first magnet, the second magnet and the third magnet may be arranged alternatingly.

In addition, the vehicle transmission may further include a shaft inserted into the central axle of the rotor. The vehicle transmission may further include a sensor unit which detects a gear selected by rotation of the knob. In particular, the sensor unit may include at least one gear which is rotated by the rotation of the knob, a magnet gear which is interlocked with the at least one gear and rotated at a speed higher than a speed of the at least one gear, and a sensor which detects a change in magnetic force of the magnet gear.

BRIEF DESCRIPTION OF THE DRAWINGS

These and/or other aspects will become apparent from the following description of the exemplary embodiments, taken in conjunction with the accompanying drawings in which.

DETAILED DESCRIPTION

Figure 1A:
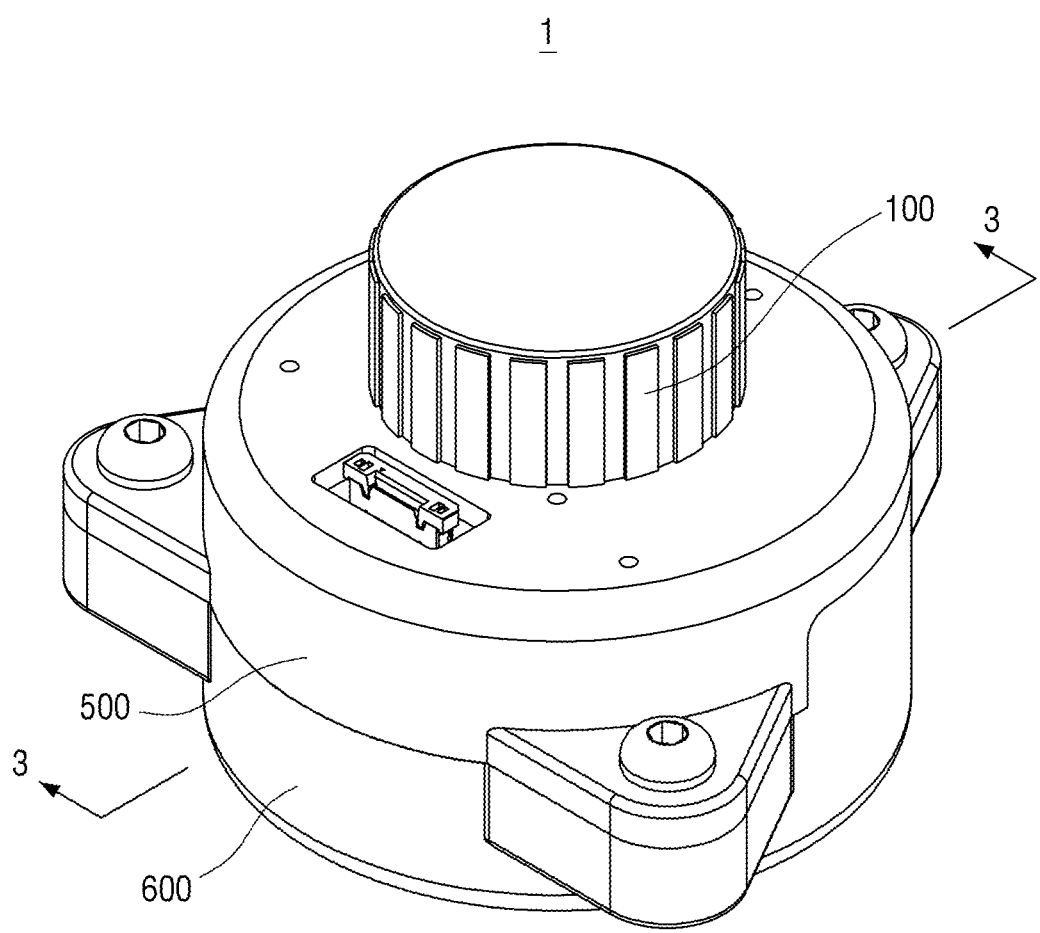
FIG. 1A is a perspective view illustrating the exterior of a vehicle transmission according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "n" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided to make this disclosure thorough and complete and fully convey the concept of the disclosure to those skilled in the art, and the present disclosure will only be defined by the appended claims. Like reference numerals refer to like elements throughout the specification. In some exemplary embodiments, well-known processes, structures, and technologies will not be specifically described in order to avoid ambiguous interpretation of the present disclosure.

Exemplary embodiments of the disclosure are described herein with reference to cross-section and/or schematic illustrations that are illustrations of exemplary embodiments of the disclosure. As such, variations from the shapes of the illustrations as a result, for example, of manufacturing techniques and/or tolerances, are to be expected. Thus, exemplary embodiments of the disclosure should not be construed as limited to the particular shapes of regions illustrated herein but are to include deviations in shapes that result, for example, from manufacturing. In addition, each component illustrated in figures of the present disclosure may have been enlarged or reduced for ease of description. Like numbers refer to like elements throughout.

Hereinafter, a vehicle transmission according to exemplary embodiments of the present disclosure will be described with reference to the attached drawings.

FIG. 1A is a perspective view illustrating the exterior of a vehicle transmission 1 according to an exemplary embodiment of the present disclosure. The vehicle transmission 1 may be installed between a center fascia and a console box of a vehicle to enable a driver to perform a gear shift operation. However, the present disclosure is not limited thereto, and the vehicle transmission 1 may be installed at various positions to which the driver can easily access.

Referring to FIG. 1A, a knob 100 may be exposed on one side of an upper housing 500 to allow the driver to rotate the knob 100 to select a desired gear. The knob 100 may include a display device (not illustrated) which displays a plurality of selectable gears or a currently selected gear. The position of the display device (not illustrated) may be fixed while an outer surface of the knob 100 is rotated to select a gear. However, the knob 100 and the display device (not illustrated) may also be rotated together.

Referring to FIG. 1A, in the vehicle transmission 1, the knob 100 may be exposed to the interior space (e.g., a cabin) of the vehicle, and the upper housing 500 and a lower housing 600 which house various elements for implementing a gear shift function or a shift lock function may be accommodated within the vehicle body to reduce the space occupied by the vehicle transmission 1 in the vehicle, thereby improving space utilization.

Figure 1B:
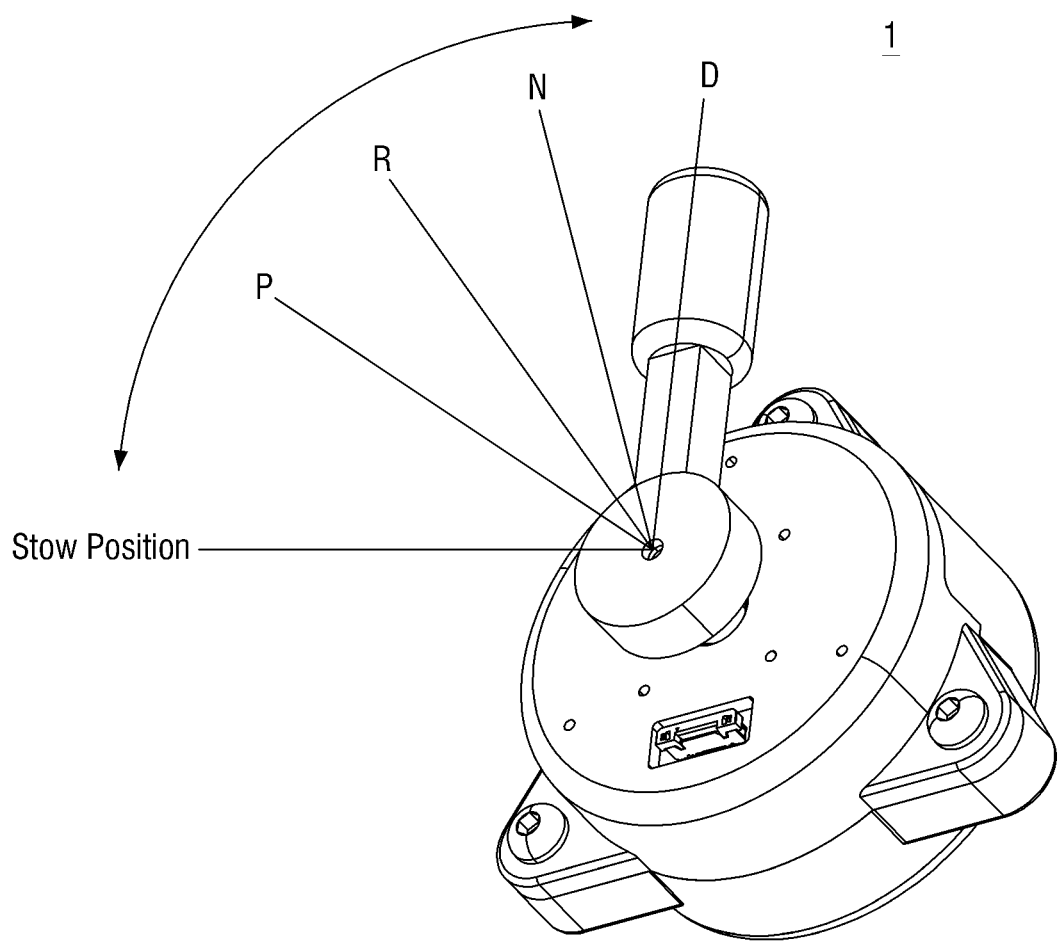
FIG. 1B is a perspective view illustrating the exterior of the vehicle transmission to which a lever-type shift handle is connected, instead of a knob of FIG. 1A according to the exemplary embodiment of the present disclosure.

As illustrated in FIG. 1B, a lever-type shift handle, instead of the knob 100, may also be connected to the vehicle transmission 1 according to the exemplary embodiment of the present disclosure. However, any component that enables the driver to operate gears may be connected to the vehicle transmission 1, and a stow position function that allows the lever to be disposed inside a console rather than in a parking gear when the vehicle is turned off may be added depending on the type of lever that is connected. Therefore, the shift handle may be prevented from being exposed when the vehicle is turned off, and unexpected accidents potentially caused by inadvertent operation of gears, which is unexpected by the driver, may be prevented.

Figure 2:
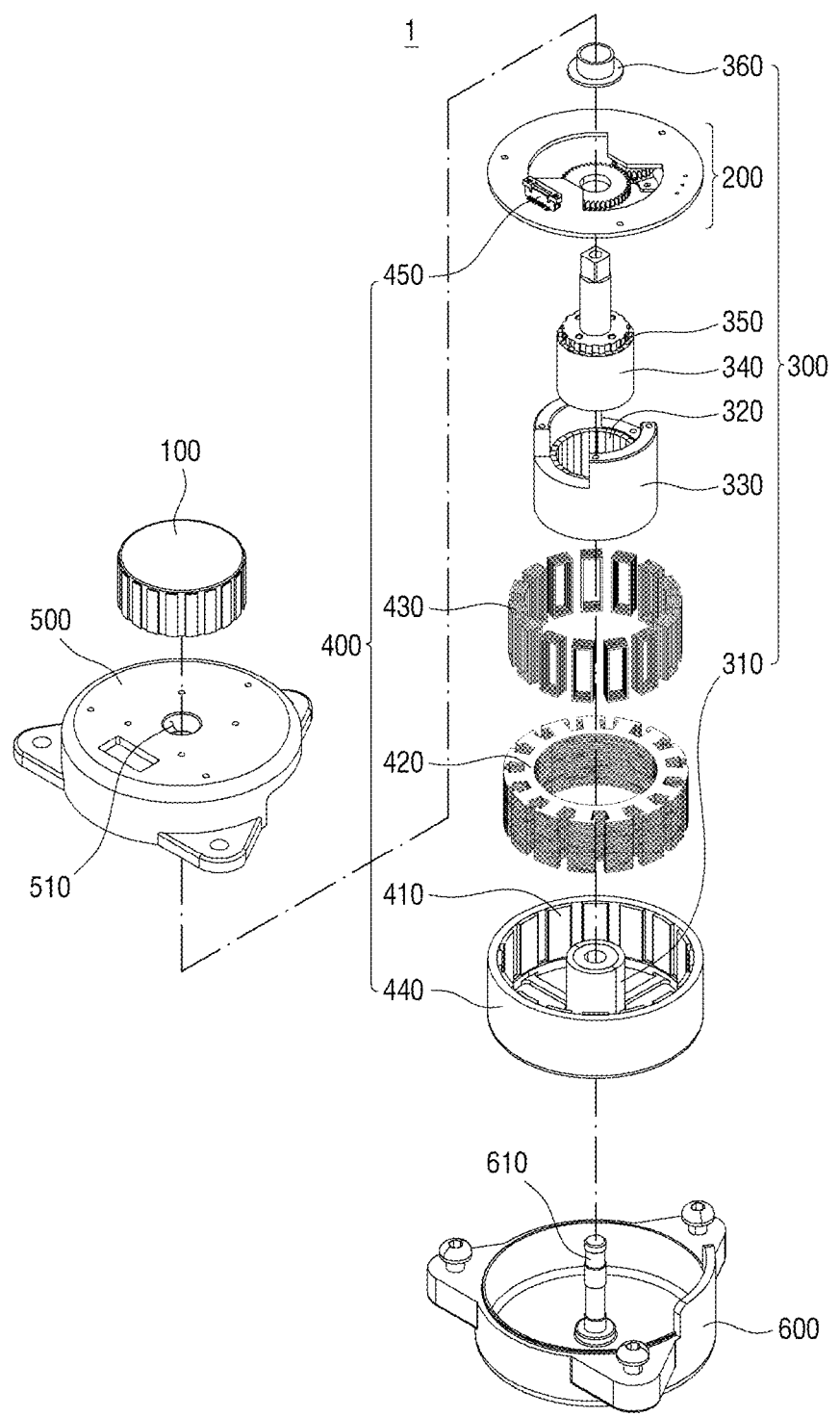
FIG. 2 is an exploded perspective view of the vehicle transmission according to the exemplary embodiment of the present disclosure.

FIG. 2 is an exploded perspective view of the vehicle transmission 1 according to the exemplary embodiment of the present disclosure. Referring to FIG. 2, the vehicle transmission 1 may include the knob 100, a sensor unit 200, a magnet gear unit 300, a driving unit 400, the upper housing 500, and the lower housing 600.

The knob 100 may be a member that is rotated to select any one of a plurality of gears associated with operation modes of a transmission, and the sensor unit 200 may be provided to detect a gear that is selected by the rotation of the knob 100. Since the rotation angle of the knob 100 may be detected by the sensor unit 200, gears may be shifted as selected.

The upper housing 500 of the vehicle transmission 1 according to the exemplary embodiment of the present disclosure may include a pawl member aperture 510 through which an extension member 341 of a pawl member 340 may be exposed. The knob 100 may be interlocked with the extension member 341 of the pawl member 340, which may be exposed through the pawl member aperture 510, to select a gear.

Figure 3:
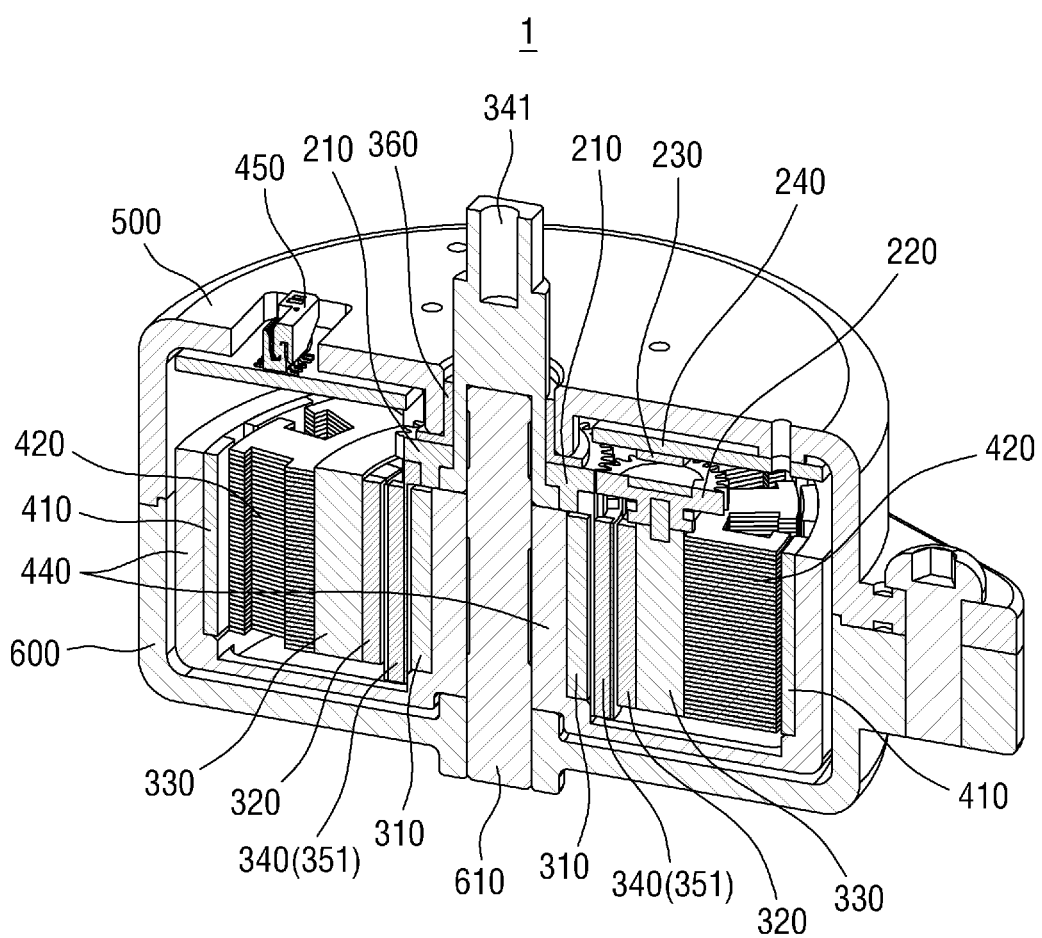
FIG. 3 is a perspective view illustrating a longitudinal section of the vehicle transmission with the knob removed, taken along line 3-3 of FIG. 1A according to the exemplary embodiment of the present disclosure.
Figure 4:
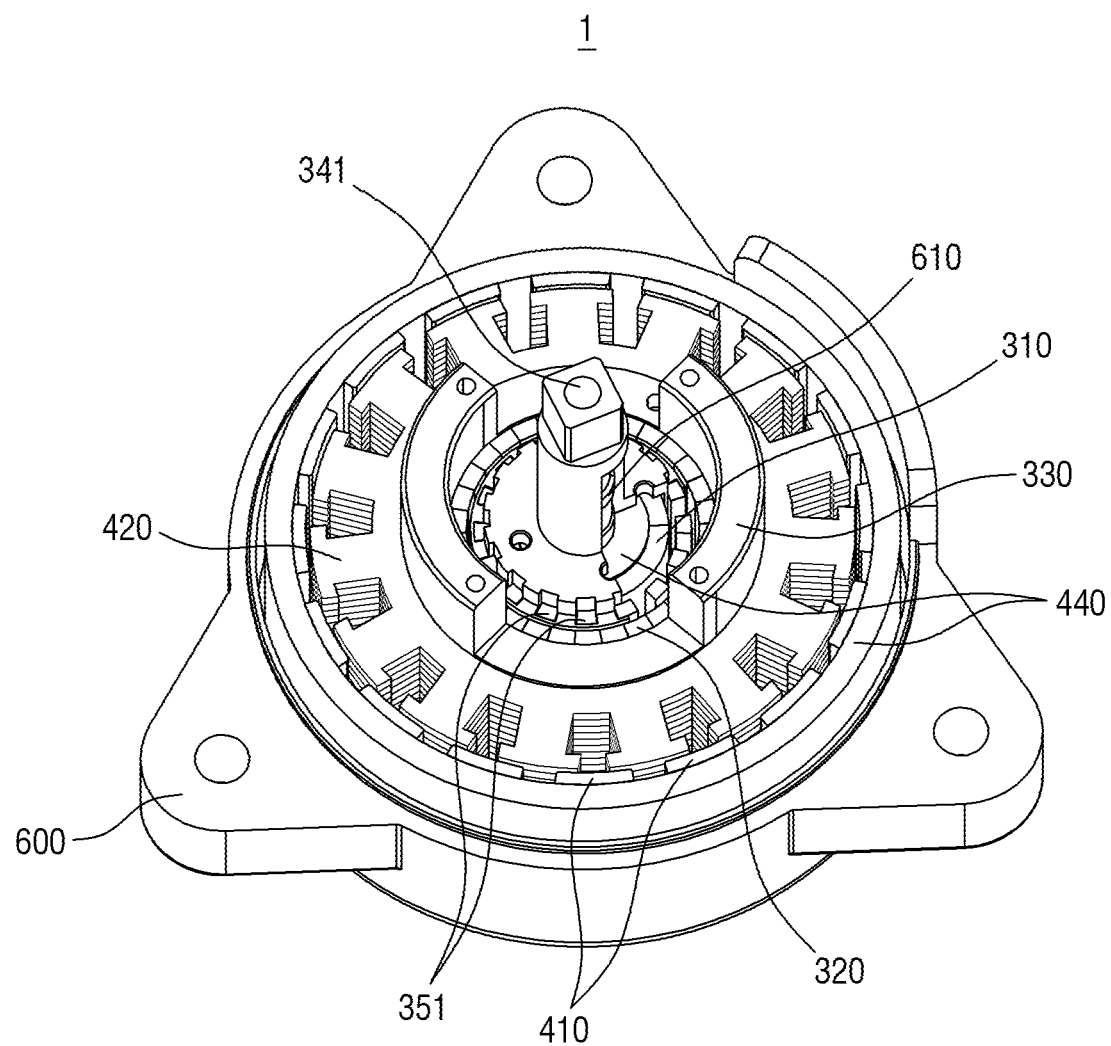
FIG. 4 is a plan perspective view of the vehicle transmission with the knob and an upper housing removed according to the exemplary embodiment of the present disclosure.

FIG. 3 is a perspective view illustrating a longitudinal section of the vehicle transmission 1 with the knob 100 removed, taken along line 3-3 of FIG. 1A. FIG. 4 is a plan perspective view of the vehicle transmission 1 with the knob 100 and the upper housing 500 removed according to the exemplary embodiment of the present disclosure. Referring to FIGS. 3 and 4, the extension member 341 to be interlocked with the knob 100 may extend from the pawl member 340 which may be an element of the magnet gear unit 300. An end of the extension member 341 connected to the knob 100 may include a polygonal cross-section or a spline and may be coupled to a groove (not illustrated) of the knob 100 which may correspond to the shape of the cross-section or the spline. Therefore, without slipping, the knob 100 may rotate to select a gear while forming an accurate rotation angle with the pawl member 340.

Figure 5:
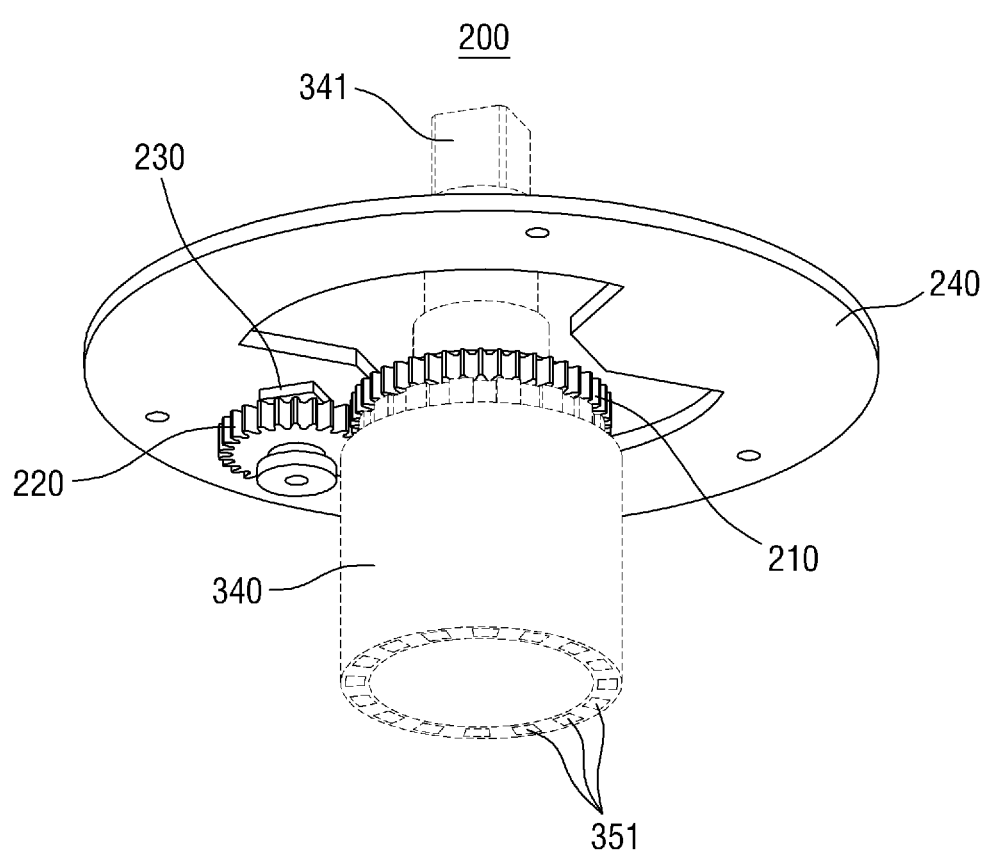
FIG. 5 illustrates a sensor unit of the vehicle transmission according to the exemplary embodiment of the present disclosure.

FIG. 5 illustrates the sensor unit 200 of the vehicle transmission 1 according to the exemplary embodiment of the present disclosure. Referring to FIGS. 2 through 5, the sensor unit 200 may include at least one first gear 210 which may be interlocked with the pawl member 340, a magnet whose position may be adjusted according to the gear movement of the sensor unit 200, a second gear 220 which may be engaged with the first gear 210, a sensor 230 which may detect a change in the magnetic force of the magnet, and a printed circuit board (PCB) 240 on which the sensor 230 may be installed. To interlock the first gear 210 of the sensor unit 200 with the pawl member 340, a ring-shaped gear that is engaged with the first gear 210 may be coupled to the extension member 341 of the pawl member 340.

The second gear 220 may be rotated by the first gear 210 which may rotate when the pawl member 340 is rotated by the rotation of the knob 100. Accordingly, the position of the magnet may be changed, and thus the magnetic force may be changed. In addition, the second gear 220 may also include a magnet. On the PCB 240, circuit elements and electronic components for detecting the rotation angle of the knob 100 and changing or controlling a gear ratio that corresponds to a selected gear may be printed and mounted.

The sensor 230 may be a sensor, such as a Hall sensor, for detecting a change in magnetic force and may detect a selected gear through a change in magnetic force caused by the rotation of the second gear 220. The second gear 220 may be rotated at a speed higher than that of the first gear 210, and the resolution of the sensor 230 for detecting a change in magnetic force may be increased to enable more accurate detection and control of gears.

Figure 6A:
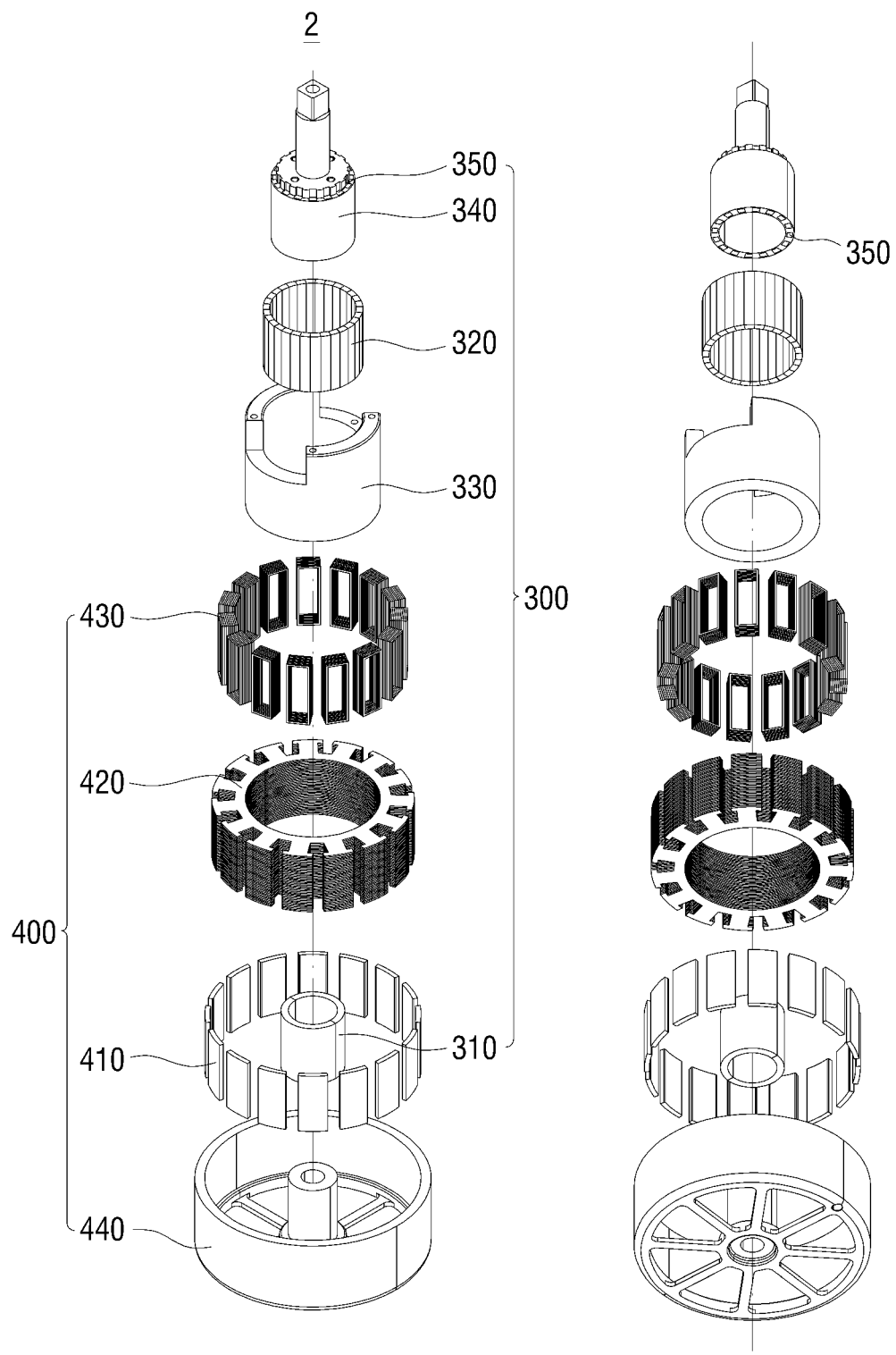
FIG. 6A is an exploded perspective view of an actuator included in the vehicle transmission of FIG. 2 according to the exemplary embodiment of the present disclosure.
Figure 6B:
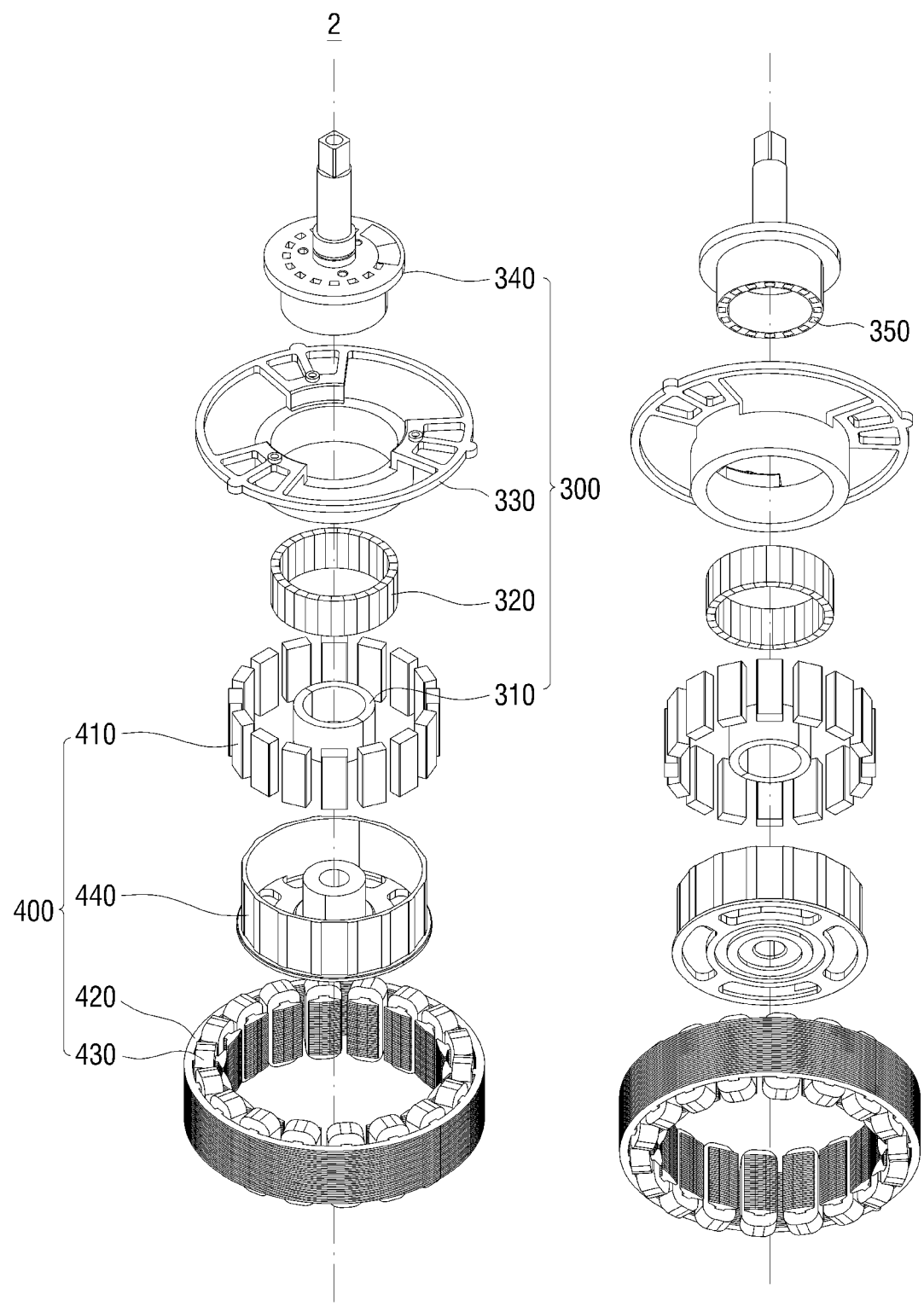
FIG. 6B is an exploded perspective view of an actuator according to an exemplary embodiment of the present disclosure.

FIG. 6A is an exploded perspective view of an actuator 2 included in the vehicle transmission 1 of FIG. 2. FIG. 6B is an exploded perspective view of an actuator 2 according to another exemplary embodiment of the present disclosure. Referring to FIGS. 6A and 6B, the actuators 2 may each include a magnet gear unit 300 which may transmit a driving force and a driving unit 400 which may drive the magnet gear unit 300.

In the actuators 2 of the vehicle transmissions 1 according to the exemplary embodiments of the present disclosure, the magnet gear unit 300 and the driving unit 400 may be integrated as a single module to implement detent torque, shift lock and automatic return functions. Therefore, the number of parts required may be reduced and assemblability may be improved, compared with the dial-type vehicle transmission 1 in the related art. The magnet gear unit 300 may include a first magnet 310, a second magnet 320 disposed outside the first magnet 310 to face the first magnet 310, and the pawl member 340 inserted between the first magnet 310 and the second magnet 320 to be rotatable.

Further, the pawl member 340 may include a magnetic body 350 on a surface inserted between the first magnet 310 and the second magnet 320 to transmit the influence of a magnetic force induced by the driving unit 400 with the first magnet 310 or the second magnet 320.

The driving unit 400 may include a stator 420 and coils 430 which may generate a magnetic force by applying a current to transmit a driving force to the magnet gear unit 300, a third magnet 410 which may face the stator 420 and may be affected by the generated magnetic force, and a rotor 440 on which the third magnet 410 may be mounted along a circumference.

In the driving unit 400 of the actuator 2 according to the exemplary embodiment of FIG. 6A, the stator 420 and the third magnet 410 may face each other along an outer circumference of the stator 420. However, the stator 420 and the third magnet 410 may also face each other along an inner circumference of the stator 420 as in the exemplary embodiment of FIG. 6B. The stator 420 and the third magnet 410 may be arranged in any manner as long as the third magnet 410 may be affected by the magnetic force generated by the stator 420.

The driving unit 400 may include a connector 450 for supplying power and transmitting a signal. Referring to FIG. 3, the connector 450 to which a plug is connected may be provided at the position of the upper housing 500 in the exemplary embodiment of the present disclosure. However, the configuration or format of the connector 450 is not limited as long as a current may be applied to the coils 430 of the stator 420.

Referring to FIGS. 2, 6A and 6B, the magnet gear unit 300 may further include a fix core 330 that surrounds the second magnet 320. The fix core 330 may physically fix the position of the magnet 320 or transmit holding currents H1 and H2 applied to the stator 420 to the second magnet 320.

In addition, referring to FIG. 6B, the fix core 330 may extend in a direction that faces the upper housing 500 to contact an inner surface of the upper housing 500 and may fix the position of the second magnet 320 more stably. Further, part of an extending surface of the fix core 330 may be open to allow the elements of the vehicle transmission 1 to be effectively received and interconnected in the housing.

The surface that extends to face the upper housing 500 may include threaded bores for screws, but the coupling component is not limited to the threaded bores. In addition, the fix core 330 may be structured to be coupled to the upper housing 600 in the exemplary embodiment of the present disclosure. However, the shape and structure of the fix core 330 are not limited thereto as long as the fix core 330 may stably fix the position of the second magnet 320. The magnet gear unit 300 and the driving unit 400 of the actuators 2 according to the exemplary embodiments of the present disclosure may be integrated to mount the first magnet 310 on a central axle 442 of the rotor 440 to transmit a driving force and a holding force. Since the fix core 330 may fix the position of the second magnet 320 more stably as described above, the rotor 440 rotated to drive the magnet gear unit 300 and the pawl member 340 rotated at a speed lower or higher than that of the rotor 440 to transmit a driving force may be driven more precisely and stably.

The driving principle of the actuator 2 will now be described in more detail in relation to the detent torque, shift lock and automatic return functions in addition to the gear shift function of the vehicle transmission 1 according to the exemplary embodiment of the present disclosure.

When the knob 100 is rotated to select a gear by an external force applied by the driver, the driver may be provided with a feel of operating the knob 100 to allow the driver to recognize the selection of the gear. The magnet gear unit 300 of the vehicle transmission 1 according to the exemplary embodiment of the present disclosure may be interlocked with the knob 100 and may provide the driver with the feel of operating the knob 100 when the driver rotates the knob 100 to select a gear.

Figure 7:
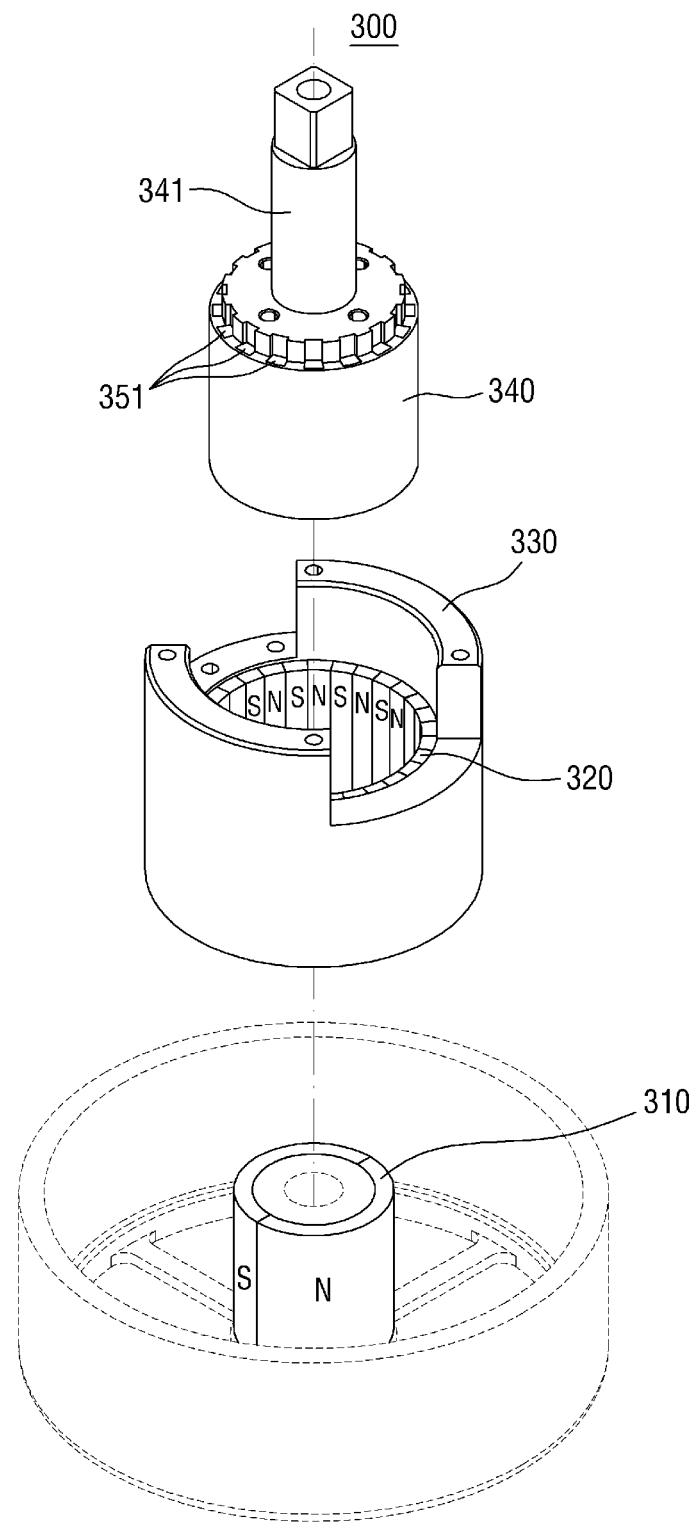
FIG. 7 illustrates a magnet gear unit of the vehicle transmission according to the exemplary embodiment of the present disclosure.
Figure 8:
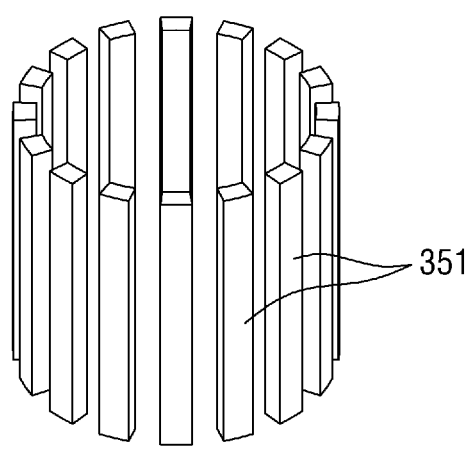
FIG. 8 illustrates pawl pieces of a magnetic body included in the magnet gear unit of the vehicle transmission according to the exemplary embodiment of the present disclosure.

FIG. 7 illustrates the magnet gear unit 300 of the vehicle transmission 1 according to the exemplary embodiment of the present disclosure. Referring to FIG. 7, each of the first magnet 310 and the second magnet 320 of the magnet gear unit 300 may include at least one pair of magnetic poles, and the polarities of the magnetic poles may be arranged alternately with each other. In addition, FIGS. 8 and 6A and 6B illustrate pawl pieces 351 that is included in the magnetic body 350 provided on the surface of the pawl member 340 inserted between the first magnet 310 and the second magnet 320. The pawl member 340 may include the pawl pieces 351 arranged at equal angles (e.g., at regular angular intervals) and corresponding to the number of magnetic pole pairs included in the second magnet 320.

Therefore, the pawl pieces 351 may transmit a driving force or a constraint force to the knob 100 interlocked with the pawl member 340 under the influence of the magnetic force generated between the first magnet 310 and the second magnet 320.

In particular, the pawl member 340 may be affected by a constraint force generated between the first magnet 310 whose rotation may be restricted by a holding force generated by the driving unit 400 and the second magnet 320 which may be fixed by the fix core 330. Therefore, when the driver rotates the knob 100 interlocked with the pawl member 340, the pawl member 340 may provide the driver with the feel of operating the knob 100.

Figure 9:
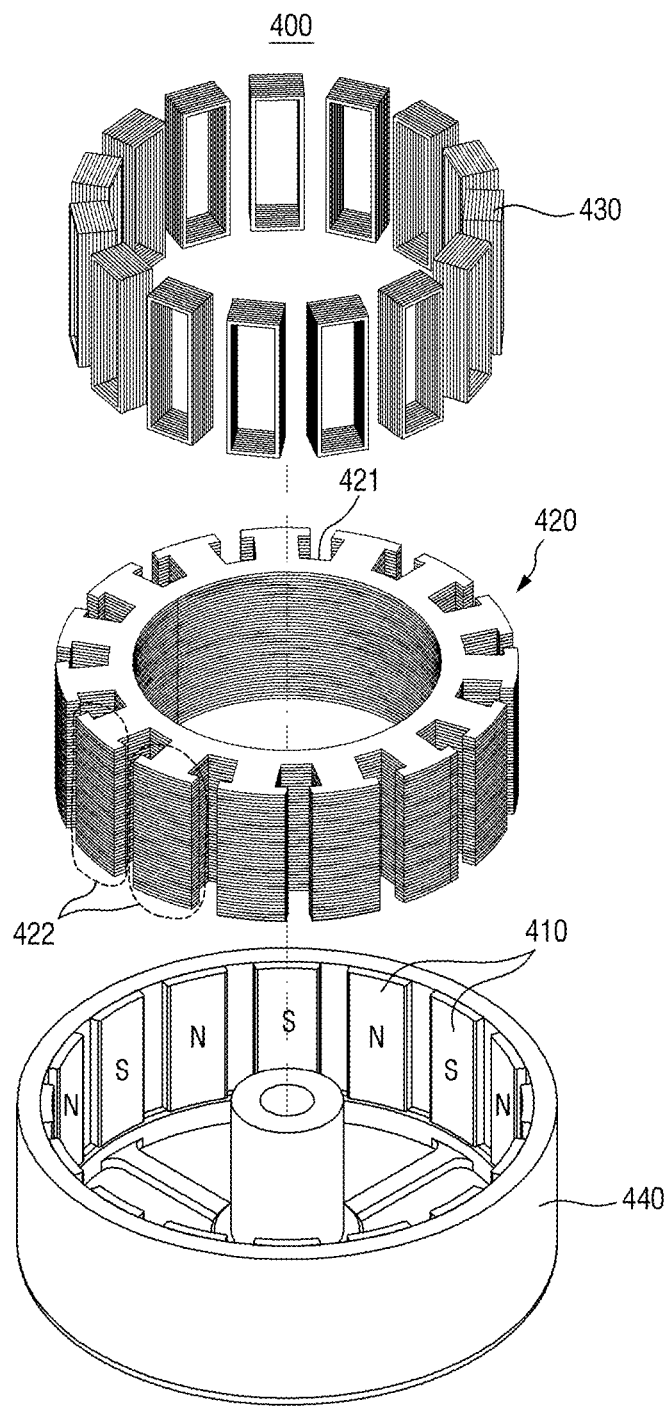
FIG. 9 illustrates a driving unit of the vehicle transmission according to the exemplary embodiment of the present disclosure.

The driving unit 400 of the vehicle transmission 1 according to the exemplary embodiment of the present disclosure may apply the first holding current H1 to the stator 420 to generate the holding torque. Referring to FIG. 9 illustrating the driving unit 400 of the vehicle transmission 1 according to the exemplary embodiment of the present disclosure, the stator 420 may include an annular core 421 having a plurality of protrusions 422 and the coils 430 connected to (or wound around) the protrusions 422 to receive a current.

Figure 10:
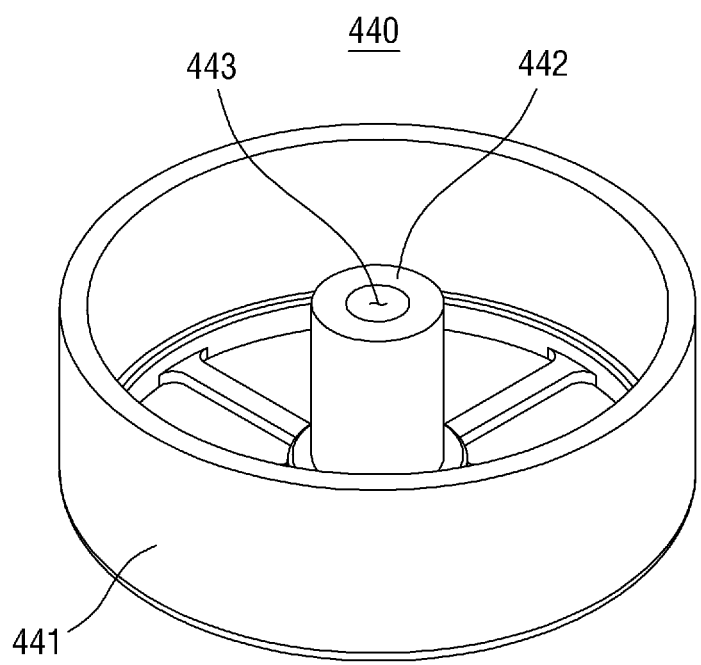
FIG. 10 illustrates a rotor of the driving unit of the vehicle transmission according to the exemplary embodiment of the present disclosure.

FIG. 10 illustrates the rotor 440 of the driving unit 400 of the vehicle transmission 1 according to the exemplary embodiment of the present disclosure. Referring to FIGS. 9 and 10, the third magnet 410 may be mounted along a circumference 441 of the rotor 440. The third magnet 410 may be placed to face the protrusions 422 of the stator 420 to be affected by a magnetic force generated by a current applied to the coils 430. In addition, the third magnet 410 may include a plurality of magnetic poles that correspond to the number of the protrusions 422 of the stator 420, and the polarities of the magnetic poles may be arranged alternatingly with each other.

Since the first magnet 310 may be mounted on the central axle 442 of the rotor 440 as described above, the driving force or the constraint force of the driving unit 400 may be transmitted to the magnet gear unit 300. In particular, a holding force may be generated between the third magnet 410 and the stator 420 by a magnetic force generated when the first holding current H1 is applied to the coils 430, and a constraint force for restricting rotation may be transmitted to the rotor 440 on which the third magnet 410 is mounted and concurrently to the first magnet 310 mounted on the central axle 442 of the rotor 440.

Therefore, a force for restricting the rotation of the pawl member 340 that include the magnetic body 350 may be generated by a magnetic force generated between the fixed first magnet 310 and the second magnet 320, and the pawl member 340 rotated by an external force applied by the operation of the knob 100 by the driver may provide the driver with the feel of operating the knob 100.

The stator 420 may generate a holding torque in the third magnet 410 in response to the first holding current H1, and the rotor 440 on which the third magnet 410 is mounted and the first magnet 310 mounted on the rotor 440 may be held by the holding torque.

Therefore, to provide the driver who selects a gear with the feel of operating the knob 100, the knob 100 may be rotated when an external force exceeding the holding torque is applied. The holding torque may also be generated by the connection of the coils 430.

Referring to FIGS. 9 and 10, a shaft aperture 443 into or through which a shaft 610 may be inserted or pass may be formed in the central axle 442 of the rotor 440. In particular, referring to the longitudinal sectional view of FIG. 3, the shaft 610 according to the exemplary embodiment of the present disclosure may include a distal end connected to the lower housing 600, may pass through the central axle 442 of the rotor 440 to be accommodated in a hollow (e.g., a cavity) of the pawl member 340 and the internal space of the extension member 341, and may serve as the axis of rotation about which the pawl member 340 and the rotor 440 may stably rotate.

Referring to FIGS. 6A and 6B, the pawl member 340 may include the hollow. Referring to the longitudinal sectional view of FIG. 3, the central axle 442 of the rotor 440, the first magnet 310 and the shaft 610 may be inserted into the hollow. In particular, referring to the plan perspective view of FIG. 4, the hollow may allow the shaft 610 to be inserted up to an inner circumferential surface of the extension member 341. Thus, the pawl member 340 and the rotor 440 may be stably rotated about the shaft 610.

In addition, referring to FIGS. 2 and 3, a cylindrical bush 360 that surrounds an outer circumferential surface of the extension member 341 may be further provided to support the rotational movement of the pawl member 340.

Meanwhile, a unit angle (e.g., an angle increment) at which the knob 100 may be rotated to select a gear may be determined by at least one of the number of magnetic pole pairs included in the first magnet 310, the number of magnetic pole pairs included in the second magnet 320, and the number of the pawl pieces 351 included in the magnetic body 350.

Figure 11:
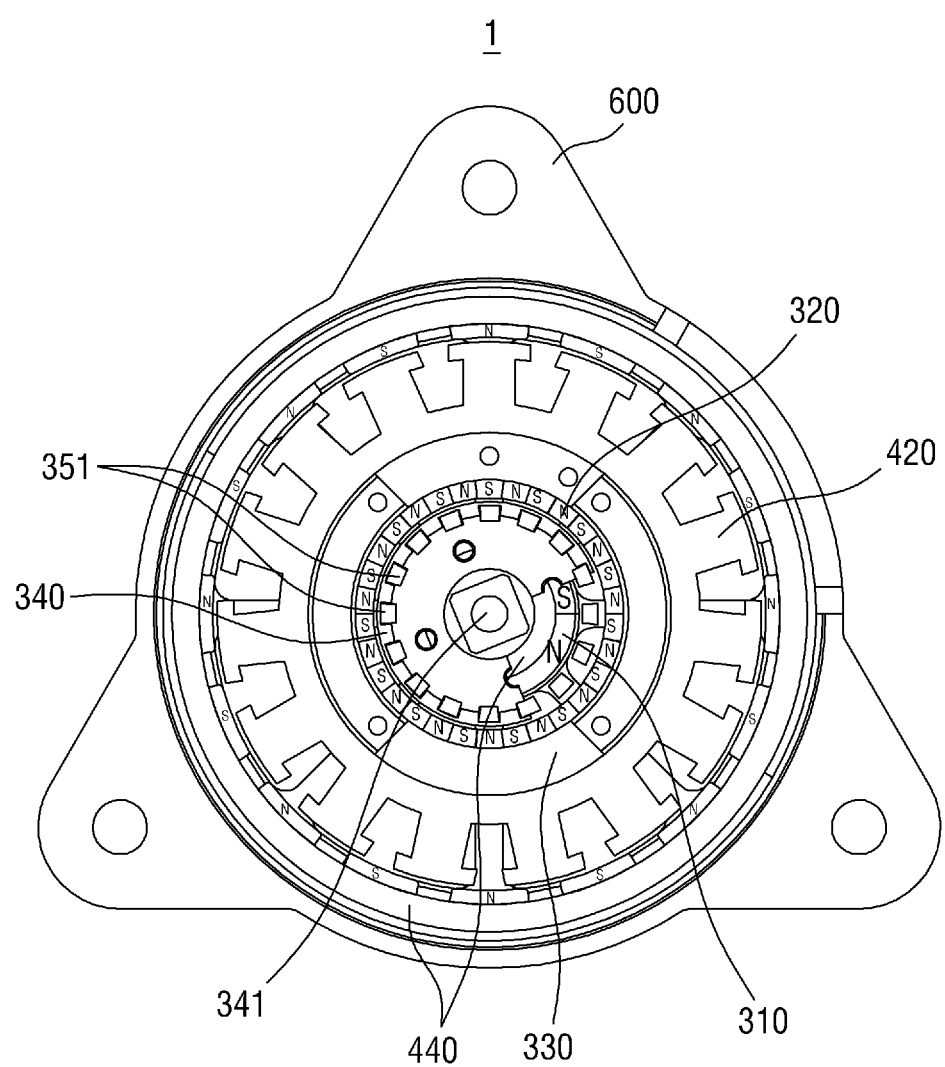
FIG. 11 is a plan view of the vehicle transmission with the knob and the upper housing removed according to the exemplary embodiment of the present disclosure, in which part of a surface constituting a pawl member is illustrated as being open for ease of description.

FIG. 11 is a plan view of the vehicle transmission 1 with the knob 100 and the upper housing 500 removed according to the exemplary embodiment of the present disclosure, in which part of a surface constituting the pawl member 340 is illustrated as being open for ease of description.

When the number of magnetic pole pairs included in the second magnet 320 of the vehicle transmission 1 is M, the number of the pawl pieces 351 included in the magnetic body 350 may also be M as illustrated in the plan view of FIG. 11, and the unit angle at which the knob 100 may be rotated to select a gear may be a multiple of an angle obtained by dividing 360° by M.

Figure 12:
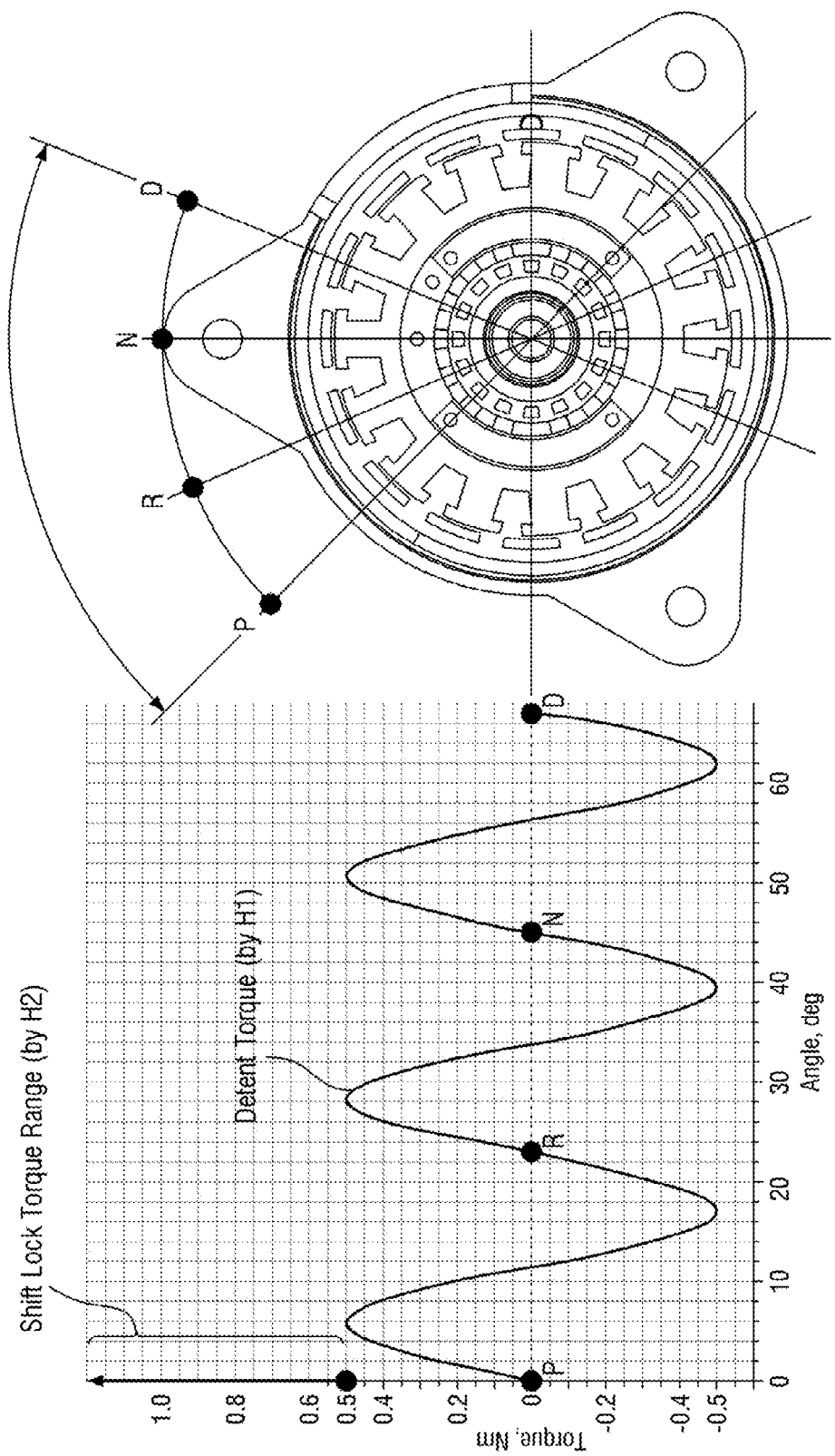
FIG. 12 is a graph illustrating the direction, intensity and range of detent torque generated with respect to the angle at which the knob of the vehicle transmission according to the exemplary embodiment of the present disclosure is rotated to select a gear and the direction, intensity and range of torque generated in a shift lock state.

The direction and magnitude of detent torque generated with respect to the angle at which the knob 100 is rotated to select a gear and the magnitude of the shift lock are illustrated in the graph of FIG. 12. Referring to FIG. 12, a torque that is substantially in a sine wave form is generated between unit angles at which the knob 100 is rotated to select a gear. Referring again to the plan view of FIG. 11, one magnetic pole pair of the second magnet 320 may be disposed between the pawl pieces 351 of the pawl member 340. Therefore, a change in magnetic flux generated between the first magnet 310 and the second magnet 320 may cause the sine wave torque to be generated in the space between the pawl pieces 351 when the knob 100 is rotated to select a gear.

In particular, when the knob 100 is rotated by about ¼ of the unit angle, the change in magnetic flux may become the maximum, and thus the magnitude of the torque generated may become the maximum. When the knob 100 is rotated by about ½ of the unit angle, the change in magnetic flux may become zero, and thus the magnitude of the torque generated may become zero. Then, at the moment when the knob 100 is rotated by more than about ½ of the unit angle, the direction of each magnetic pole pair of the second magnet 320 disposed at an angle formed between the pawl pieces 351 may be reversed from N to S or from S to N. Accordingly, the direction of the torque generated may also be reversed. Therefore, when the knob 100 forms a rotation angle exceeding about ½ of the unit angle, a torque may be generated in a direction in which the knob 100 is rotated to select a gear, thus enabling the driver to recognize the selection of the gear.

In the exemplary embodiment of the present disclosure, the pawl pieces 351 may be inserted between the first magnet 310 and the second magnet 320, and M pawl pieces 351 may be provided to correspond to the M magnetic pole pairs included in the second magnet 320. Thus, the sine wave torque may be generated according to a multiple of an angle obtained by dividing 360° by M, and the unit angle at which the knob 100 is rotated may be determined to be the multiple of the angle obtained by dividing 360° by M.

However, the number of the pawl pieces 351 may not correspond to the number of magnetic pole pairs included in the second magnet 320 but may correspond to the number of magnetic pole pairs included in the first magnet 310. Additionally, the pawl pieces 351 may also be disposed not between the first magnet 310 and the second magnet 320 but at an innermost or outermost position. Thus, the unit angle at which the knob 100 is rotated to select a gear may be determined according to the angular period of the sine wave torque generated. Therefore, the unit angle at which the knob 100 is rotated to select a gear may be determined by a multiple of an angle obtained by dividing 360° by any one of the number of magnetic pole pairs included in the first magnet 310, the number of magnetic pole pairs included in the second magnet 320, and the number of the pawl pieces 351 included in the magnetic body 350.

An automatic vehicle transmission may require the shift lock function as a safety measure that maintains gear shifting locked to prevent sudden acceleration of the vehicle when the driver does not operate the brake in the parking gear. To this end, the vehicle transmission 1 according to the exemplary embodiment of the present disclosure may apply the second holding current H2 to the stator 420 when the driver does not operate the brake in the parking gear.

On the same principle that the detent torque is generated, the third magnet 410 may be fixed by a magnetic force generated by the second holding current H2, and the fixed third magnet 410 may restrict the rotation of the rotor 440, which, in turn, restricts the rotation of the first magnet 310 mounted on the central axle 442 of the rotor 440. Therefore, the rotation of the knob 100 may be prevented by the torque generated in the pawl member 340 disposed between the fixed first magnet 310 and the second magnet 320. In addition, when the state of preventing the rotation of the knob 100 is not maintained by an external force, the stator 420 may rotate the rotor 440 by applying a current, thereby moving the knob 100 to a preset position.

FIG. 12 is a graph illustrating the direction and the range of magnitude of a torque generated in a shift lock state in the vehicle transmission 1 according to the exemplary embodiment of the present disclosure. Referring to FIG. 12, the torque generated when there is no brake operation by the driver in the parking gear may be expressed as a dot on the graph at a rotation angle of 0° that corresponds to a park (P) gear. The magnitude of the second holding current H2 may be greater than that of the first holding current H1 to prevent the knob 100 from being rotated even when the driver applies more than a certain force.

In addition, the actuator 2 of the vehicle transmission 1 according to the exemplary embodiment of the present disclosure may return the knob 100 to the parking gear when a condition for returning from a non-parking gear to the parking gear is satisfied. For example, when the driver turns off the vehicle in a drive (D) gear or inputs a particular operation, the driving unit 400 may be driven to automatically return the knob 100 to the parking gear by rotating the knob 100.

In the exemplary embodiment, reverse (R), neutral (N) and D may be non-parking gears in which the vehicle may be driven, and P may be a parking gear in which the driving of the vehicle is restricted. When a condition for returning from a non-parking gear to the parking gear is satisfied, the vehicle transmission 1 according to the exemplary embodiment of the present disclosure may rotate the rotor 440 by applying a current to the stator 420 of the driving unit 400, and the magnet gear unit 300 driven by the driving unit 400 may return the interlocked knob 100 to the parking gear by rotating the knob 100 at a speed lower or higher than the rotation speed of the rotor 440.

In particular, the number of the protrusions 422 of the stator 420 may correspond to the number of magnetic poles of the third magnet 410 arranged to face the protrusions 422 with the polarities of the magnetic poles alternating with each other. The magnetic force generated in response to a current applied to the stator 420 may create an attractive force or a repulsive force between the protrusions 422 and the third magnet 410, and thereby may rotate the rotor 440.

Since a magnet gear transmission ratio may be defined as a ratio of the number of magnetic pole pairs included in the second magnet 320 to the number of magnetic pole pairs included in the first magnet 310, each of the first magnet 310 and the second magnet 320 may include at least one magnetic pole pair, and the pawl member 340 may be rotated at a speed lower or higher than that of the rotor 440 by the magnet gear transmission ratio.

When the rotor 440 is rotated, the first magnet 310 mounted on the central axle 442 of the rotor 440 may also be rotated at the same speed as the rotor 440. Accordingly, the pawl member 340 may be rotated at a speed lower or higher than the rotor 440 by the magnet gear transmission ratio between the rotated first magnet 310 and the fixed second magnet 320, and thereby may return the knob 100 to the parking gear.

Figure 13:
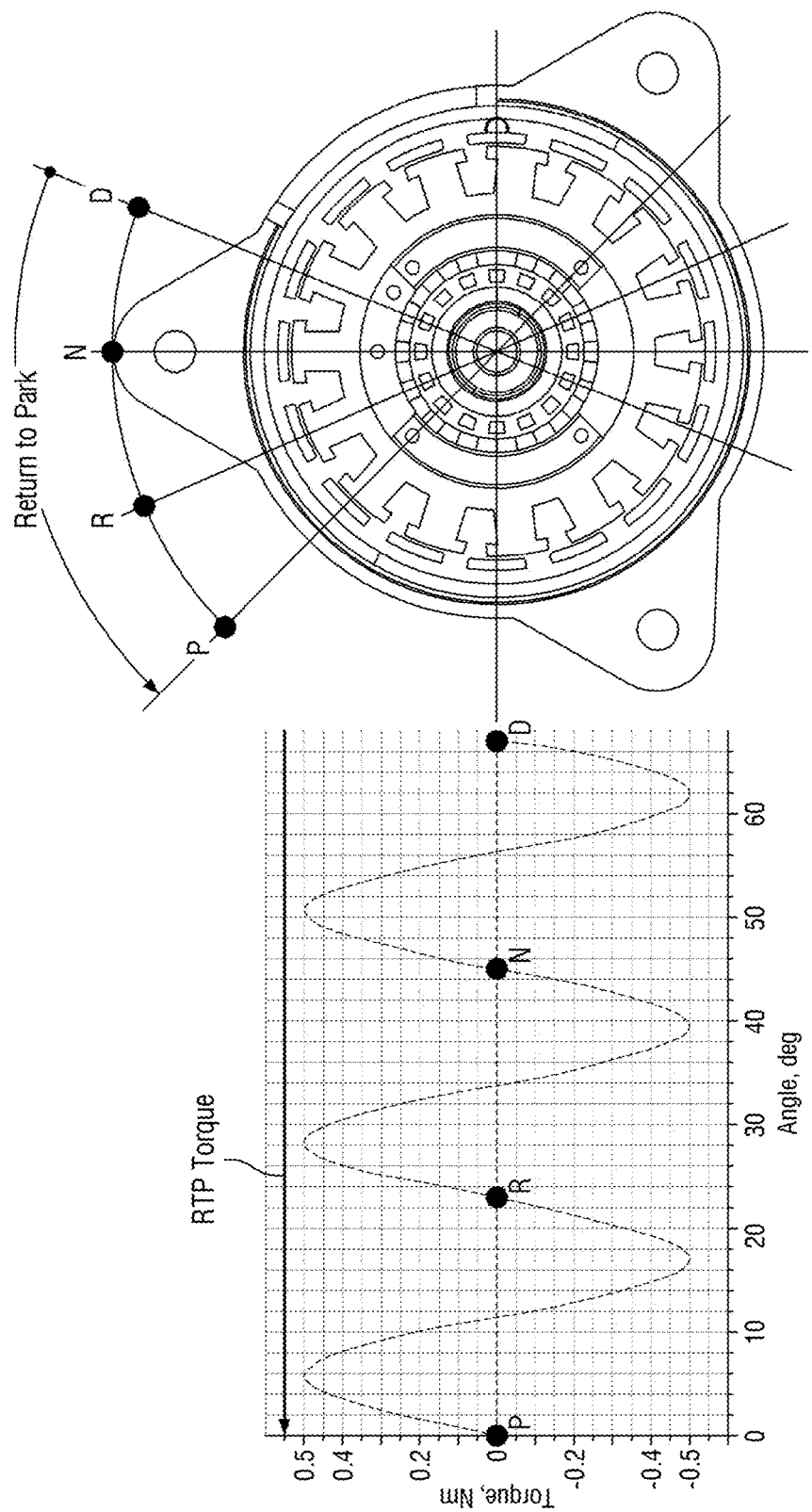
FIG. 13 is a graph illustrating the direction and intensity of torque generated when the knob is returned to a parking gear when a condition for returning from a non-parking gear to the parking gear is satisfied in the vehicle transmission according to the exemplary embodiment of the present disclosure.
Figure 14:
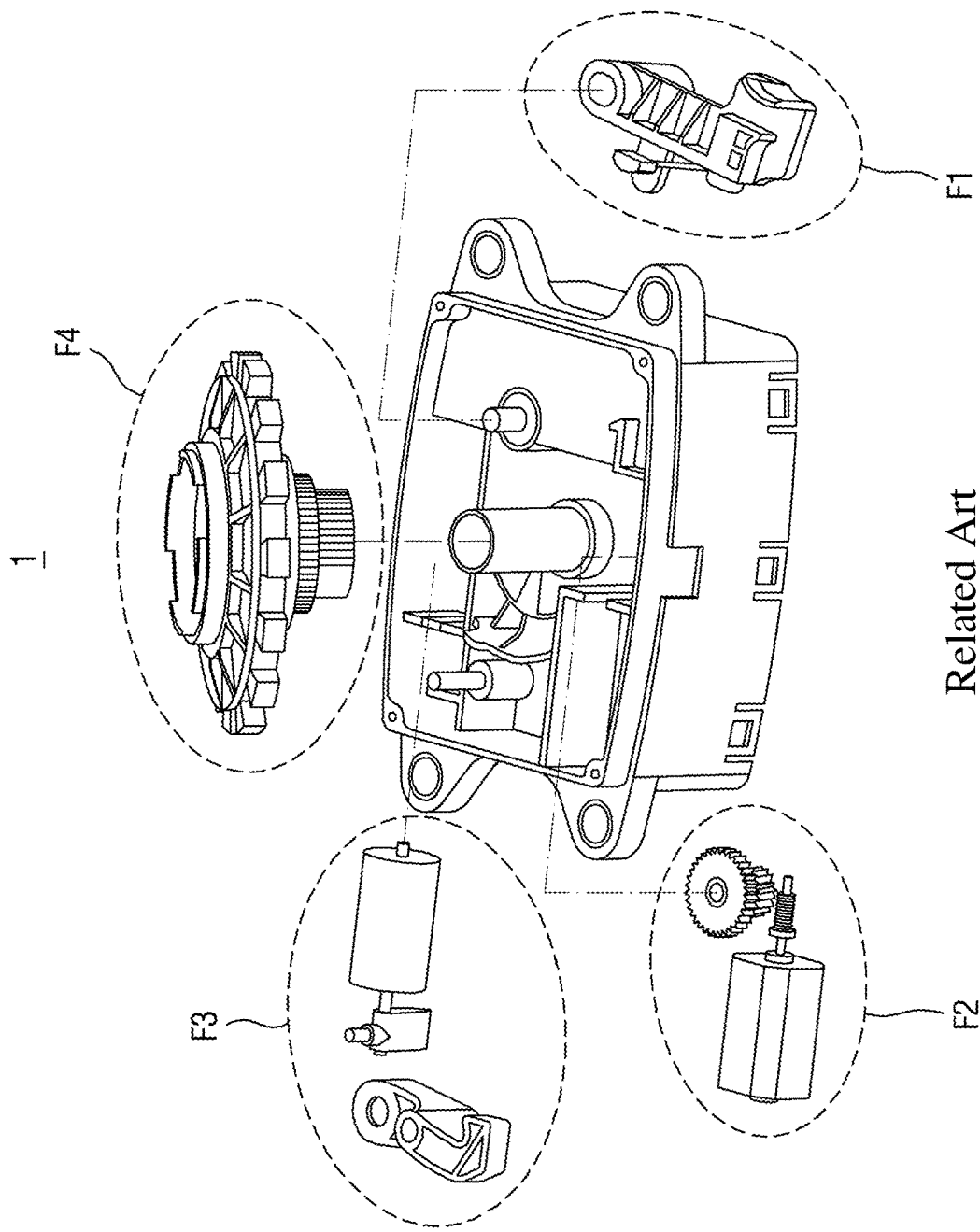
FIG. 14 illustrates an example of a vehicle transmission in the related art including a general gear and capable of performing a dial-type shift operation.

FIG. 13 is a graph illustrating the direction and magnitude of a torque generated when the knob 100 is returned to the parking gear when a condition for returning from a non-parking gear to the parking gear is satisfied in the vehicle transmission 1 according to the exemplary embodiment of the present disclosure. Referring to FIG. 13, the vehicle transmission 1 may generate a torque of constant magnitude in the same direction to return the knob 100 to a position that corresponds to a rotation angle of 0° when a condition for returning from a non-parking gear (R, N or D) to the parking gear (P) is satisfied.

In the exemplary embodiment, the knob 100 may be returned to the parking gear when a condition for returning from a non-parking gear to the parking gear is satisfied. However, the knob 100 may also be returned to a previous gear when a faulty operation of the knob 100 occurs while the vehicle is being driven. In order to prevent another gear from being selected while the vehicle is being driven in the D gear, the actuator 2 may return the knob 100 to the D gear, which is a previous gear, when the knob 100 is rotated by the driver's faulty or inadvertent operation.

In addition, when a shift condition is satisfied in an autonomous driving mode, the knob 100 may be rotated to select a gear that corresponds to the shift condition. The actuator 2 and the knob 100 may be interlocked based on various shift conditions. In addition, although FIG. 13 has been described above using the vehicle transmission 1 according to the exemplary embodiment of the present disclosure as an example, it also is applicable to the actuator 2 according to the exemplary embodiment, and the actuator 2 may output a torque having a predetermined period in a predetermined direction as illustrated in FIG. 13.

In the actuator 2 and the vehicle transmission 1 including the same according to the exemplary embodiment of the present disclosure, the pawl member 340 may be inserted between the first magnet 310 and the second magnet 320. However, the position where the pawl member 340 is inserted is not limited thereto, and the pawl member 340 may also be inserted outside the second magnet 320 or may be inserted inside the first magnet 310.

When the pawl member 340 is inserted at the outermost position, it may include a hollow that may accommodate the central axle 442 of the rotor 440, the first magnet 310 and the second magnet 320. In this case. the knob 100 may be interlocked with the second magnet 320 to implement the detent torque, shift lock and automatic return functions described above. When the pawl member 340 is inserted at the innermost position, the position of the pawl member 340 may be fixed, the second magnet 320 may be mounted on the central axle 442 of the rotor 440, and the knob 100 may be interlocked with the first magnet 310 to implement the detent torque, shift lock and automatic return functions.

In summary, the positions of the first magnet 310, the second magnet 320 and the pawl member 340 are not limited to the exemplary embodiment of the present disclosure. When the knob 100 is interlocked with any one of the first magnet 310, the second magnet 320 and the pawl member 340, the interlocked component may be disposed between the two non-interlocked components among the first member 310, the second member 320 and the pawl member 340.

In addition, any one of the first magnet 310, the second magnet 320 and the pawl member 340 which is not interlocked with the knob 100 may be mounted on the central axle 442 of the rotor 440. When the central axle 442 of the rotor 440 is disposed at the innermost position, any one of the first magnet 310, the second magnet 320 and the pawl member 340 which is disposed at the outermost position may be fixedly installed to implement the detent torque, shift lock and automatic return functions.

On the same principle, when the central axle 442 of the rotor 440 is disposed at the outermost position, any one of the first magnet 310, the second magnet 320 and the pawl member 340 which is disposed at the innermost position may be fixedly installed to implement the detent torque, shift lock and automatic return functions.

Exemplary embodiments of the present disclosure may provide at least one of the following advantages. Since a magnet gear may be used, actuator noise may be reduced, compared with a conventional actuator using a general gear. A dial-type shift operation may improve utilization of the space inside a vehicle. The noise generated when gears are shifted may be reduced and assemblability may be improved by reducing the number of parts required. The mechanism for implementing detent torque, shift lock, and automatic return functions may be simplified compared with methods in the related art. The effects of the exemplary embodiments are not restricted to the one set forth herein. The above and other effects of the exemplary embodiments will become more apparent to one of daily skill in the art to which the exemplary embodiments pertain by referencing the claims.

While the present disclosure has been particularly shown and described with reference to exemplary embodiments thereof, it will be understood by those of ordinary skill in the art that various changes in form and detail may be made therein without departing from the spirit and scope of the present disclosure as defined by the following claims. The exemplary embodiments should be considered in a descriptive sense only and not for purposes of limitation. The scope of the present disclosure is defined by the following claims, rather than by the above-described detailed description. The meanings and scope of the claims, and all modifications or modified shapes, which are derived from equivalent concepts thereof, should be understood as being included in the scope of the present disclosure.

What is claimed is:

1. An actuator comprising:
   a magnet gear unit which transmits a driving force, wherein the magnet gear unit comprises:
   a first magnet;
   a second magnet disposed outside the first magnet to face the first magnet; and
   a pawl member inserted in parallel between the first magnet and the second magnet; and
   a driving unit which drives the magnet gear unit, wherein the driving unit comprises:
   a circular rotor disposed on a central axle, wherein any one of the rust magnet,
   the second magnet or the pawl member is mounted to the rotor;

a third magnet mounted along a circumference of the rotor; and a stator comprising an annular core having a plurality of protrusions that face the third magnet and coils connected to the protrusions.

2. The actuator of claim 1, wherein the rotor is rotated as an attractive force or a repulsive force is exerted on the third magnet by a magnetic force generated when a current is applied to the coils, and wherein any one among the first magnet, the second magnet and the pawl member which is disposed between the other two among the first magnet, the second magnet and the pawl member is accelerated or decelerated relative to the rotor based on a magnet gear transmission ratio, which is defined as a ratio of the number of magnetic pole pairs included in the second magnet to the number of magnetic pole pairs included in the first magnet.

3. The actuator of claim 1, wherein the third magnet comprises a plurality of magnetic poles that correspond to a number of the plurality of protrusions of the stator, and each of the first magnet and the second magnet comprises at least one pair of magnetic poles, and wherein the magnetic poles of the first magnet, the second magnet and the third magnet are arranged alternatingly.

4. The actuator of claim 1, further comprising a shaft inserted into the central axle of the rotor.

5. The actuator of claim 1, wherein the pawl member comprises a magnetic body provided on a surface thereof.

6. A vehicle transmission comprising:

a knob configured to be rotated to select a gear position;

a magnet gear unit interlocked with the knob, wherein the magnet gear unit provides a driver with a feel of operating the knob when the driver rotates the knob; and a driving unit which generates a holding torque, wherein the magnet gear unit comprises a first magnet, a second magnet disposed outside the first magnet to face the first magnet, and a pawl member inserted in parallel between the first magnet and the second magnet, wherein the first magnet, the second magnet, and the pawl member are rotatable about a same center as the knob, wherein the magnet gear unit and the driving unit are integrated as a single module, and wherein the driving unit comprises:

a circular rotor disposed on a central axle, wherein any one of the first magnet, the second magnet or the pawl member which is non-interlocked with the knob is mounted to the rotor;

a third magnet mounted along a circumference of the rotor; and a stator comprising an annular core having a plurality of protrusions that face the third magnet and coils connected to the protrusions.

7. The vehicle transmission of claim 6, wherein the pawl member comprises a magnetic body provided on a surface thereof.

8. The vehicle transmission of claim 6, wherein any one of the first magnet, the second magnet, or the pawl member is interlocked with the knob.

9. The vehicle transmission of claim 6, wherein the holding torque is generated between the third magnet and the stator by a magnetic force generated when a first holding current is applied to the coils or by connection of the coils, and the other two among the first magnet, the second magnet and the pawl member which are non-interlocked with the knob are fixed to provide the feel of operating the knob when the knob is rotated.

10. The vehicle transmission of claim 6, wherein the holding torque is generated between the third magnet and the stator by a magnetic force generated when a second holding current is applied to the coils to prevent the rotation of the knob.

11. A vehicle transmission comprising:

a knob configured to be rotated to select a gear position;

a magnet gear unit which transmits a driving force to the knob when an interlocking condition is satisfied; and a driving unit which drives the magnet gear unit, wherein the magnet gear unit comprises:

a first magnet;

a second magnet disposed outside the first magnet to face the first magnet; and a pawl member inserted in parallel between the first magnet and the second magnet, and wherein the driving unit comprises:

a circular rotor on a central axle, wherein any one of the first magnet, the second magnet or the pawl member is mounted to the rotor;

a third magnet mounted along a circumference of the rotor; and a stator comprising an annular core having a plurality of protrusions that face the third magnet and coils connected to the protrusions.

12. The vehicle transmission of claim 11, wherein the pawl member comprises a magnetic body provided on a surface thereof.

13. The vehicle transmission of claim 12, wherein the rotor is rotated as an attractive force or a repulsive force is exerted on the third magnet by a magnetic force generated when a current is applied to the coils, and wherein any one among the first magnet, the second magnet and the pawl member which is disposed between the other two among the first magnet, the second magnet and the pawl member is accelerated or decelerated relative to the rotor based on the number of magnetic pole pairs included in each of the first magnet and the second magnet and the number of pawl pieces included in the magnetic body.

14. The vehicle transmission of claim 13, wherein the knob is interlocked with any one of the first magnet, the second magnet or the pawl member which is rotationally decoupled from the central axle of the rotor.

15. The vehicle transmission of claim 13, wherein the knob is rotated to return to parking gear when a condition for returning from a non-parking gear to the parking gear is satisfied.

16. The vehicle transmission of claim 13, wherein when a shift condition is satisfied in an autonomous driving mode, the knob is rotated to select the gear position that corresponds to the shift condition.

17. The vehicle transmission of claim 12, wherein a unit angle at which the knob is rotated to select the gear position is determined by a multiple of an angle obtained by dividing 360° by one of a number of magnetic pole pairs included in the first magnet, a number of magnetic pole pairs included in the second magnet, or a number of pawl pieces included in the magnetic body.

18. The vehicle transmission of claim 11, wherein the third magnet comprises a plurality of magnetic poles that correspond to the number of the protrusions, and each of the first magnet and the second magnet comprises at least one pair of magnetic poles, wherein the magnetic poles of the first magnet, the second magnet and the third magnet are arranged alternatingly.

19. The vehicle transmission of claim 11, further comprising a shaft inserted into the central axle of the rotor.

* * * * *